US008132291B2

(12) United States Patent
Tsai et al.

(10) Patent No.: US 8,132,291 B2
(45) Date of Patent: Mar. 13, 2012

(54) HINGE DEVICE

(75) Inventors: Chia-Ming Tsai, Taipei (TW); Shao-Tang Ma, Taipei (TW); Yi-Chen Tao, Taipei (TW); Bor-Woei Li, Taipei (TW); Wang-Sing Cai, Taipei (TW)

(73) Assignee: Pegatron Corporation, Taipei (TW)

( * ) Notice: Subject to any disclaimer, the term of this patent is extended or adjusted under 35 U.S.C. 154(b) by 180 days.

(21) Appl. No.: 12/726,361

(22) Filed: Mar. 18, 2010

(65) Prior Publication Data

US 2010/0236020 A1 Sep. 23, 2010

(30) Foreign Application Priority Data

Mar. 20, 2009 (TW) ................................ 98109188 A

(51) Int. Cl.
*E05D 7/10* (2006.01)
(52) U.S. Cl. ......................................................... 16/224
(58) Field of Classification Search .................... 16/224, 16/225, 385, 273, 275, 276; 403/122, 127, 403/132, 133, 135, 140; 29/458, 11, 898.09, 29/898.13; 384/206, 209–211; 264/130, 264/131, 242, 257, 328.1
See application file for complete search history.

(56) References Cited

U.S. PATENT DOCUMENTS

| 1,868,891 | A | * | 7/1932 | Faudi | 403/122 |
| 2,533,494 | A | * | 12/1950 | Mitchell, Jr. | 248/160 |
| 2,908,519 | A | * | 10/1959 | Holden | 403/122 |
| 3,679,248 | A | * | 7/1972 | Herbenar | 403/140 |
| 3,691,788 | A | * | 9/1972 | Mazziotti | 464/139 |
| 4,673,329 | A | * | 6/1987 | Kato | 414/744.5 |
| 6,379,073 | B1 | * | 4/2002 | Yoo et al. | 403/90 |
| 6,494,635 | B1 | * | 12/2002 | Merlo | 403/90 |
| 6,767,153 | B1 | * | 7/2004 | Holbrook | 403/56 |
| 7,793,389 | B1 | * | 9/2010 | Michnik et al. | 16/422 |
| 2008/0023606 | A1 | * | 1/2008 | Kalis et al. | 248/288.31 |
| 2008/0105289 | A1 | | 5/2008 | Ma | |
| 2009/0205167 | A1 | * | 8/2009 | Easley | 16/224 |

* cited by examiner

*Primary Examiner* — Chuck Y. Mah
(74) *Attorney, Agent, or Firm* — Winston Hsu; Scott Margo

(57) ABSTRACT

A hinge device includes a bearing seat, a spherical joint, a plurality of positioning pins, and a retaining ring. The bearing seat has a containing recess. The spherical joint is rotatably disposed in the containing recess, and the surface of the spherical joint has a plurality of positioning holes. The positioning pins are disposed at the bearing seat and capable of sliding toward or away from the spherical joint. The positioning pins correspond to parts of the positioning holes respectively when the spherical joint rotates to a specific position relative to the bearing seat. The retaining ring is disposed at an opening of the containing recess of the bearing seat and surrounds the positioning pins, the retaining ring is against the positioning pins to allow the positioning pins to be fastened in the corresponding positioning holes when the spherical joint rotates to the specific position relative to the bearing seat.

10 Claims, 9 Drawing Sheets

HINGE DEVICE

CROSS-REFERENCE TO RELATED APPLICATIONS

This Non-provisional application claims priority under 35 U.S.C. §119(a) on Patent Application No(s). 098109188 filed in Taiwan, Republic of China on Mar. 20, 2009, the entire contents of which are hereby incorporated by reference.

BACKGROUND OF THE INVENTION

1. Field of the Invention

This invention relates to a hinge device and, more particularly, to a hinge device having a spherical joint.

2. Description of the Related Art

With continuous improvement of information technology, various kinds of electronic devices, such as personal digital assistants (PDAs), tablet PCs, digital cameras, global positioning system (GPS) devices and so on, come out one after another. The electronic devices can further be connected with hinge devices according to needs in use. For example, the hinge device in a car can be used for mounting an object such as a GPS device or a PDA to facilitate watch and operation by users. Furthermore, the object, such as a digital camera, a tablet PC and so on, can also be mounted to the hinge device to facilitate operation.

Generally speaking, the object mounted to the hinge device can be rotated relative to the hinge device, such that the users can adjust the device to an angle at which the object is convenient for operation or watch. The object mounted to the hinge device can be rotated relative to the hinge device via a uniaxial rotatable bracket.

However, although a rotatable range of the device can be improved via the combination of more than two uniaxial rotatable brackets, compared with that of a rotatable structure in a spherical joint type, the rotatable range of the device is still limited. However, in using the rotatable structure in the spherical joint type, when the users need to adjust an angle of the rotatable structure in the spherical joint type, first they need to release a clamp of the rotatable structure, and then they can lock the clamp after adjusting to a suitable angle. Thus, each time the adjustment is performed, the above operation needs to be repeated, which is still inconvenient in use.

BRIEF SUMMARY OF THE INVENTION

This invention provides a hinge device having a wide rotatable range and simple operation.

The invention provides a hinge device including a bearing seat, a spherical joint, a plurality of positioning pins, and a retaining ring. The bearing seat has a containing recess. The spherical joint is rotatably disposed in the containing recess, and the surface of the spherical joint has a plurality of positioning holes. The positioning pins are disposed at the bearing seat. The positioning pins are capable of sliding toward or away from the spherical joint, and correspond to parts of the positioning holes respectively when the spherical joint rotates to a specific position relative to the bearing seat. The retaining ring is disposed at an opening of the containing recess of the bearing seat and surrounds the positioning pins. The retaining ring is against the positioning pins to allow the positioning pins to slide toward the spherical joint thus to be fastened in the corresponding positioning holes when the spherical joint rotates to the specific position relative to the bearing seat.

In one embodiment of the invention, the bearing seat may include a cup-shaped body and a cover. The cup-shaped body provides the containing recess. The cup-shaped body has a plurality of notches at the periphery of the opening of the containing recess for containing the positioning pins, to allow portions of the positioning pins to protrude from an inner wall of the containing recess. The cover is disposed at the opening of the containing recess to retain the spherical joint in the containing recess, and a hole is disposed at the center of the cover for exposing a portion of the spherical joint.

In one embodiment of the invention, the hinge device may further include a plurality of elastic elements disposed between the positioning pins and the bearing seat.

In one embodiment of the invention, each of the elastic elements may be a spring.

In one embodiment of the invention, the retaining ring may have a plurality of protrusions at the inner side, and the retaining ring may be against the positioning pins by the protrusions after being rotated a specific angle relative to the bearing seat.

In one embodiment of the invention, the retaining ring may include an outer ring and an inner ring. The outer ring surrounds the positioning pins. The inner ring is disposed between the outer ring and the positioning pins for providing the protrusions.

In one embodiment of the invention, the inner ring may be a ring-shaped elastic sheet, and a portion of the ring-shaped elastic sheet may be bent inwardly to form the protrusions.

In one embodiment of the invention, the retaining ring and the bearing seat may have at least one first positioning structure and at least one second positioning structure corresponding to each other, respectively. After the retaining ring is rotated the specific angle relative to the bearing seat, the first positioning structure and the second positioning structure may be engaged with each other.

In one embodiment of the invention, the first positioning structure may include a first protruding rib. The second positioning structure may include two blocking portions and a second protruding rib. The first protruding rib is disposed to move between the two blocking portions. The second protruding rib is adjacent to one of the blocking portions. Therefore, after the retaining ring rotates the specific angle relative to the bearing seat, the first protruding rib is engaged between the second protruding rib and the adjacent blocking portion.

In one embodiment of the invention, the hinge device may further include a fixed bracket connected with the bearing seat or the spherical joint.

To sum up, the hinge device in the invention has a wide rotatable range via the rotation of the spherical joint relative to the bearing seat. In addition, the positioning pins can be pushed into the positioning holes of the spherical joint by the rotation of the retaining ring thus to achieve a positioning function. Therefore, users can conveniently operate the hinge device.

These and other features, aspects, and advantages of the present invention will become better understood with regard to the following description, appended claims, and accompanying drawings.

DETAILED DESCRIPTION OF THE INVENTION

Figure 1:
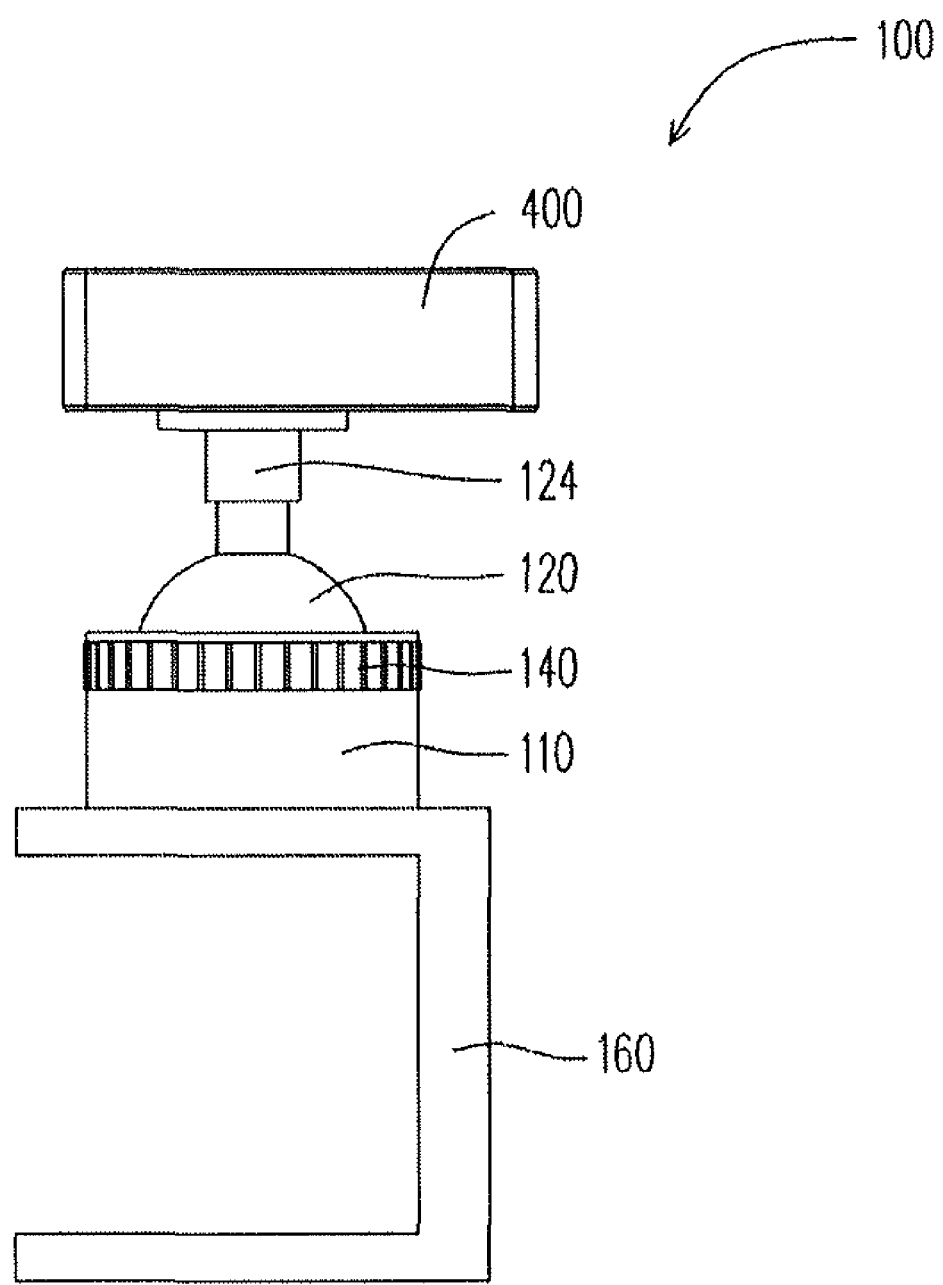
FIG. 1 is a side view showing a hinge device according to one embodiment of the invention.
Figure 2:
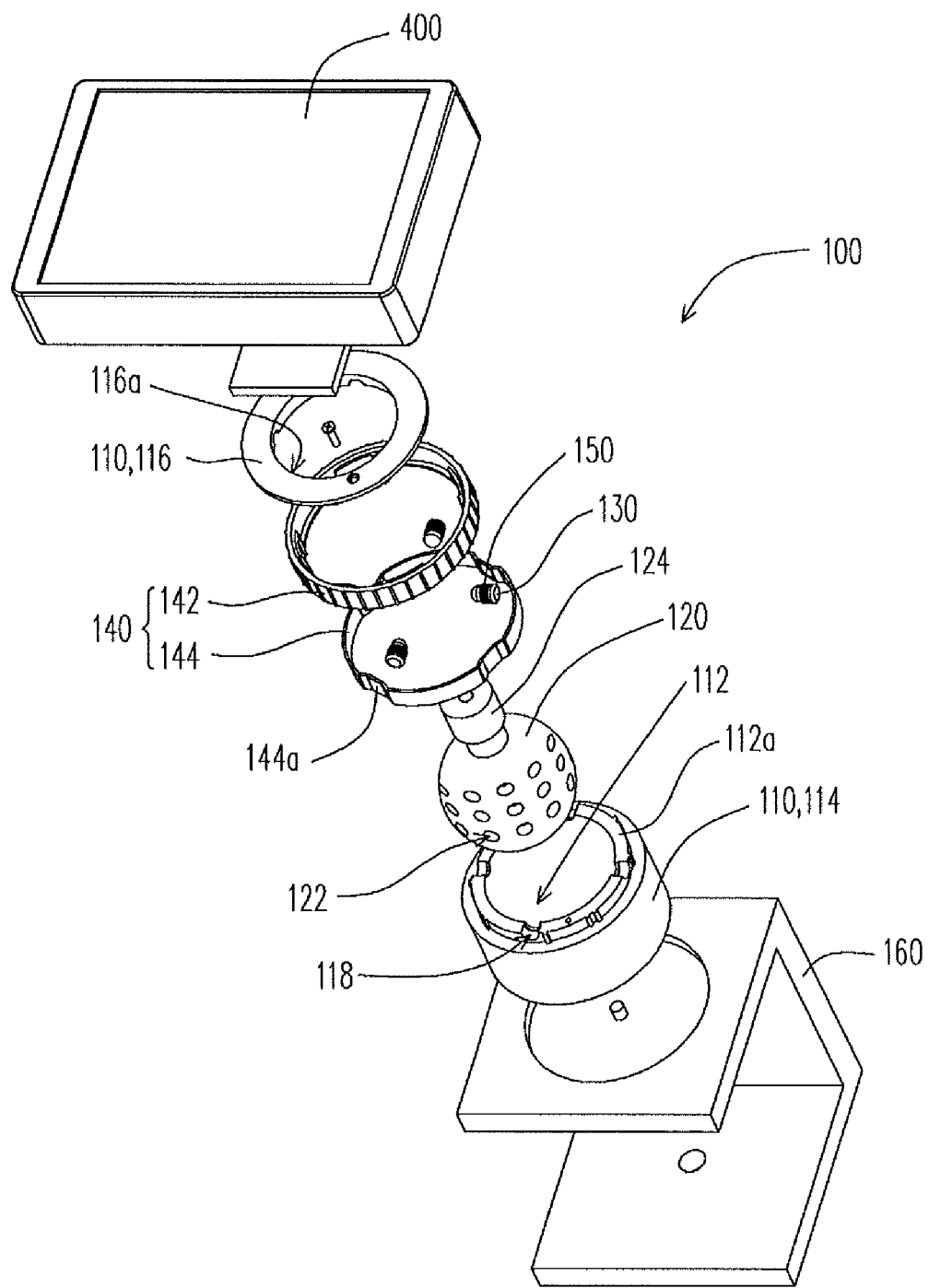
FIG. 2 is an exploded diagram showing the hinge device in FIG. 1.
Figure 3:
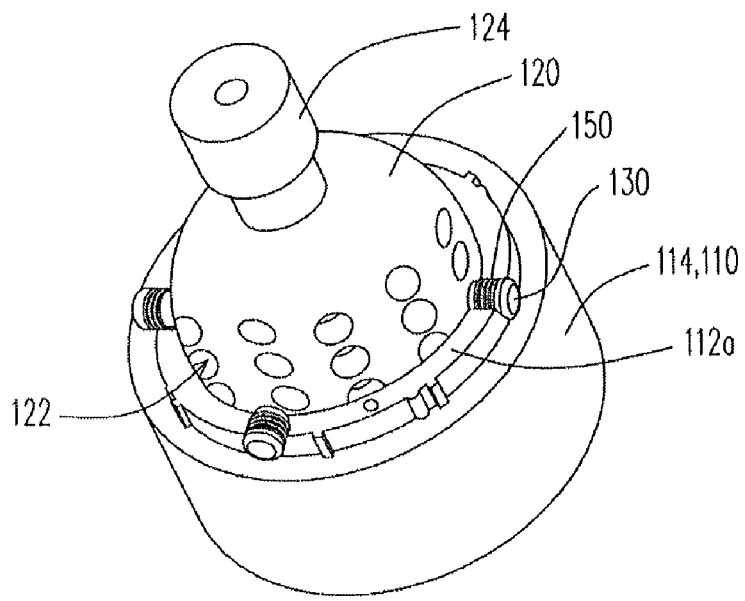
FIG. 3 to FIG. 5 are three-dimensional diagrams showing parts of the hinge device in FIG. 1.
Figure 4:
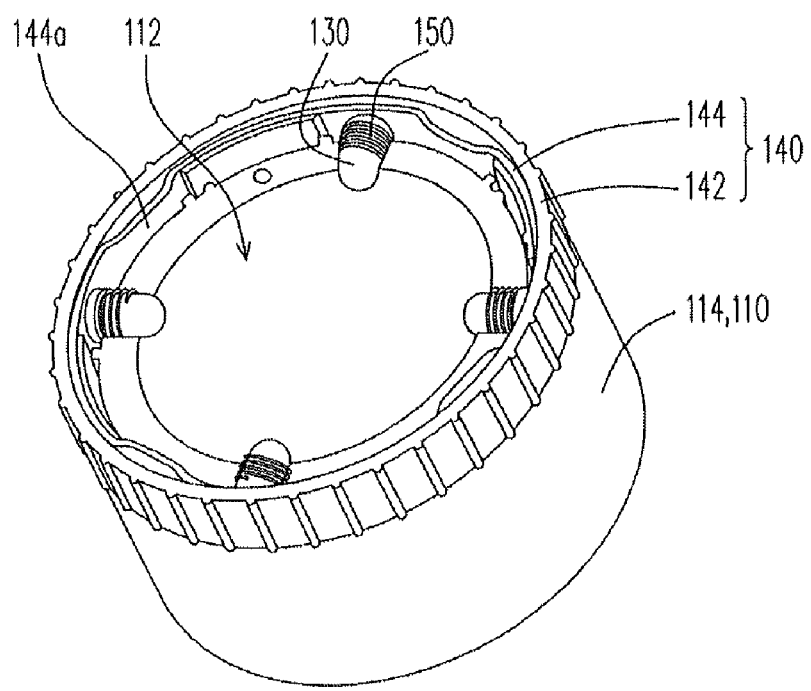
Figure 5:
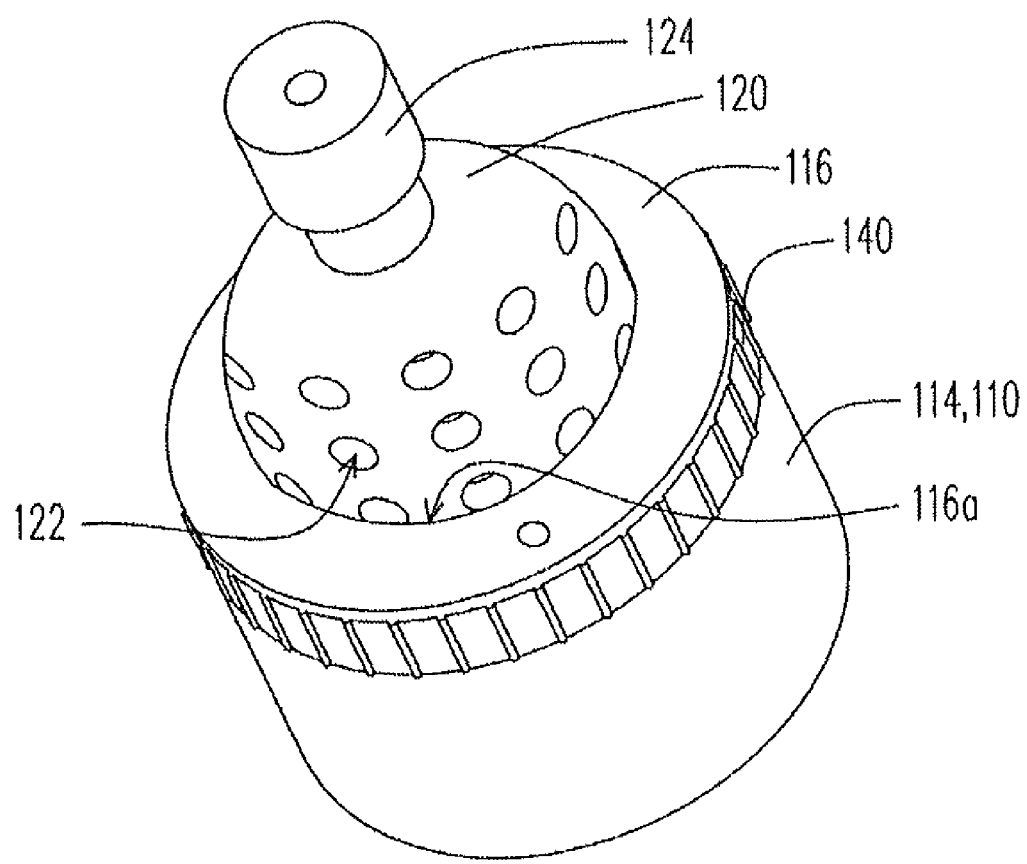

FIG. 1 is a side view showing a hinge device according to one embodiment of the invention. FIG. 2 is an exploded diagram showing the hinge device in FIG. 1. FIG. 3 to FIG. 5 are three-dimensional diagrams showing parts of the hinge device in FIG. 1. Please refer to FIG. 1 to FIG. 5. A hinge device 100 in the embodiment includes a bearing seat 110, a spherical joint 120, a plurality of positioning pins 130 (four positioning pins 130 are shown), and a retaining ring 140. The bearing seat 110 has a containing recess 112. The spherical joint 120 is disposed in the containing recess 112, and the surface of the spherical joint 120 has a plurality of positioning holes 122.

The positioning pins 130 are disposed at the bearing seat 110, and portions of the positioning pins 130 protrude from an inner wall of the containing recess 112. The positioning pins 130 are disposed to slide toward or away from the spherical joint 120. After the spherical joint 120 rotates to a specific position relative to the bearing seat 110, the positioning pins 130 are inserted into the corresponding positioning holes 122, respectively. The retaining ring 140 is disposed at the bearing seat 110. After the spherical joint 120 rotates to the specific position relative to the bearing seat 110, the retaining ring 140 is against the positioning pins 130 to allow the positioning pins 130 to be fastened in the corresponding positioning holes 122.

Please refer to FIG. 3 to FIG. 5. When the spherical joint 120 is rotated to different specific positions relative to the bearing seat 110, the four positioning pins 130 can correspond to the four positioning holes 122. At that moment, a user can rotate the retaining ring 140 to push the four positioning pins 130 into the corresponding four positioning holes 122, respectively, such that the spherical joint 120 and the bearing seat 110 are fixed at a relative angle. In other words, the user can finish the operation of the hinge device 100 via simple steps of rotating the spherical joint 120 and rotating the retaining ring 140.

Please refer to FIG. 2 to FIG. 4. In the embodiment, the bearing seat 110 includes a cup-shaped body 114 and a cover 116. The cup-shaped body 114 provides the containing recess 112, and the cup-shaped body 114 has a plurality of notches 118 at the periphery of an opening of the containing recess 112 for containing the positioning pins 130. In one preferred embodiment, the periphery of the opening of the containing recess 112 has a protruding edge 112a, and the notches 118 are formed at the protruding edge 112a. The cover 116 is disposed at the opening of the containing recess 112 to retain the spherical joint 120 in the containing recess 112. A hole 116a is disposed at the center of the cover 116 for exposing a portion of the spherical joint 120. The positioning pins 130 slide toward or away from the spherical joint 120 by sliding relative to the notches 118.

Please refer to FIG. 4 and FIG. 5. The retaining ring 140 is disposed at the opening of the containing recess 112 and surrounds the positioning pins 130. The retaining ring 140 has a plurality of protrusions 144a at the inner side. After the retaining ring 140 is rotated a specific angle relative to the bearing seat 110, the retaining ring 140 can be against the positioning pins 130 by the protrusions 144a. The retaining ring 140 includes an outer ring 142 and an inner ring 144. The outer ring 142 surrounds the positioning pins 130. The inner ring 144 is disposed between the outer ring 142 and the positioning pins 130 for providing the protrusions 144a. In a preferred embodiment, the inner ring 144 is a ring-shaped elastic sheet, and a portion of the ring-shaped elastic sheet is bent inwardly to form the protrusions 144a.

Figure 6A:
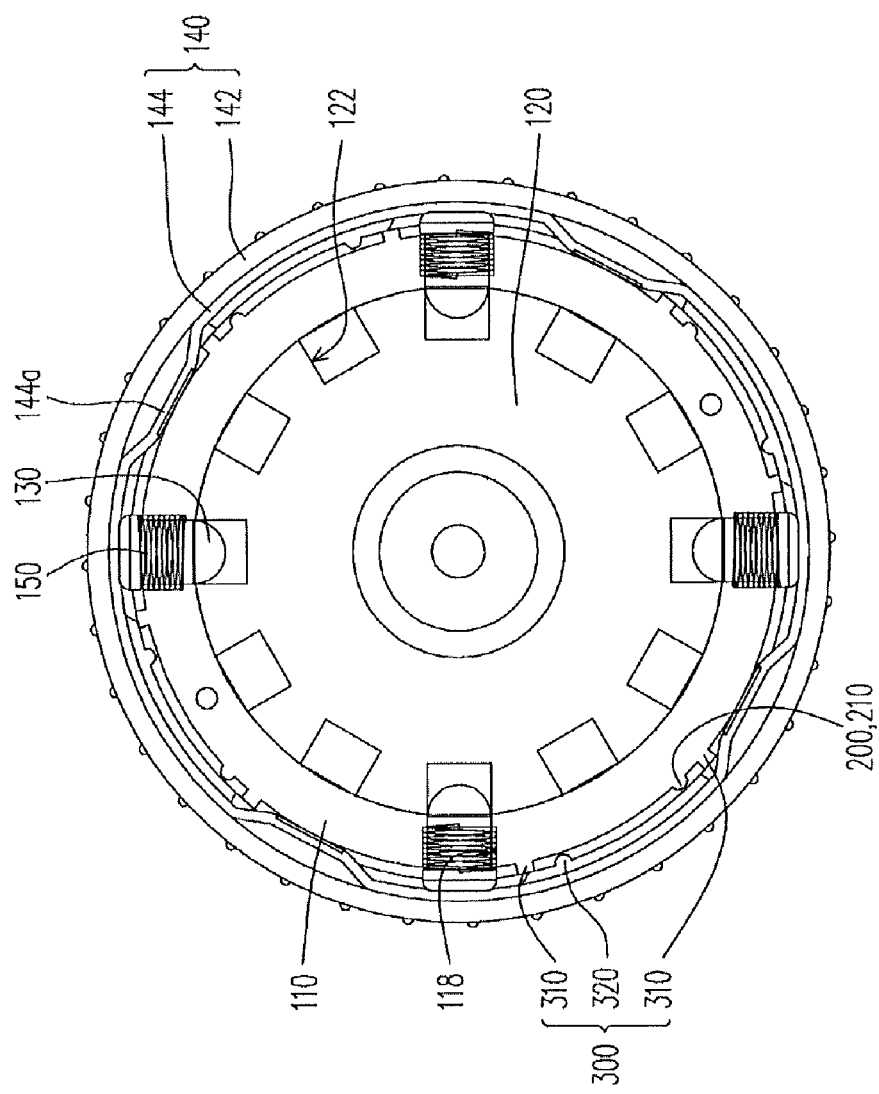
FIG. 6A and FIG. 6B are top views showing parts of the hinge device in FIG. 1 in operation.
Figure 6B:
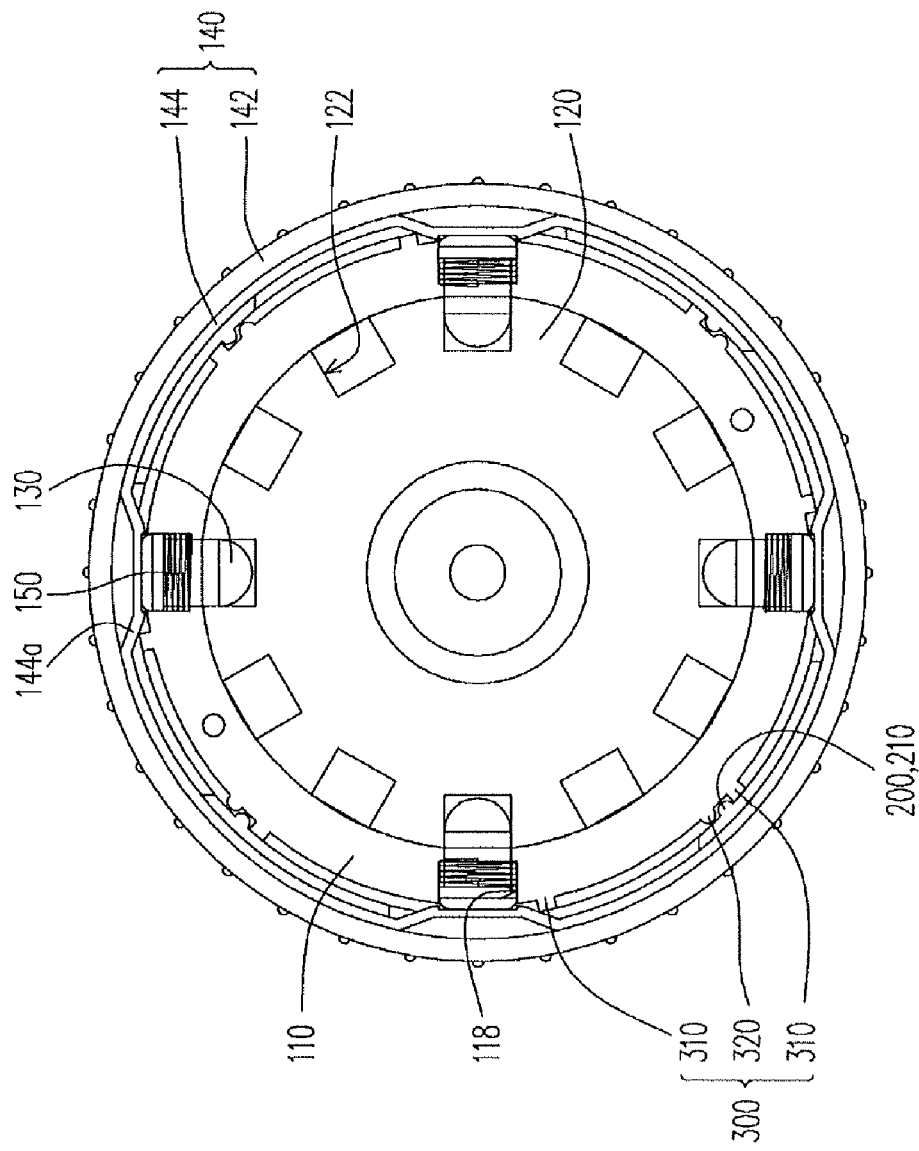
Figure 7B:
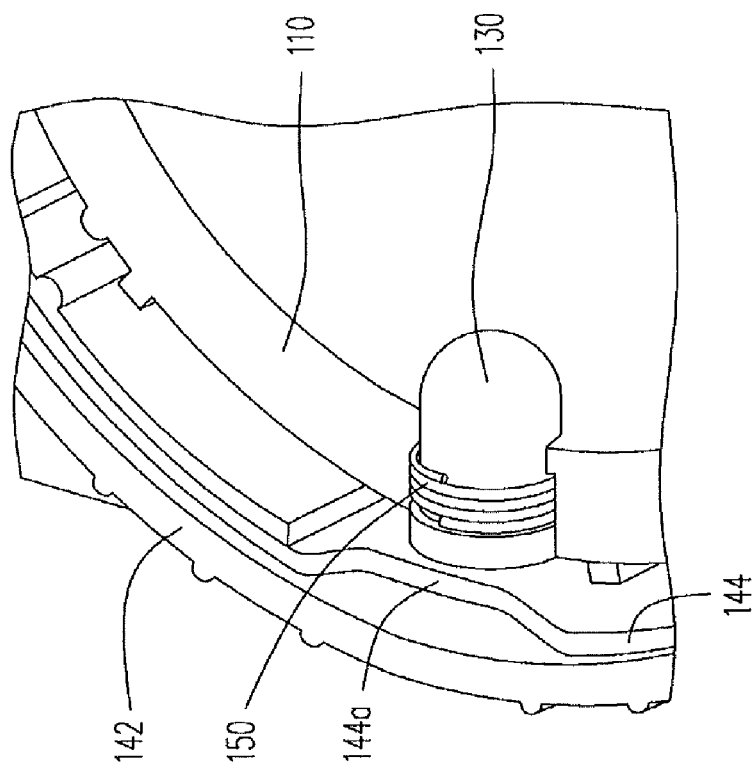
FIG. 7A and FIG. 7B are three-dimensional diagrams showing parts of the hinge device in FIG. 1 in operation.
Figure 7A:
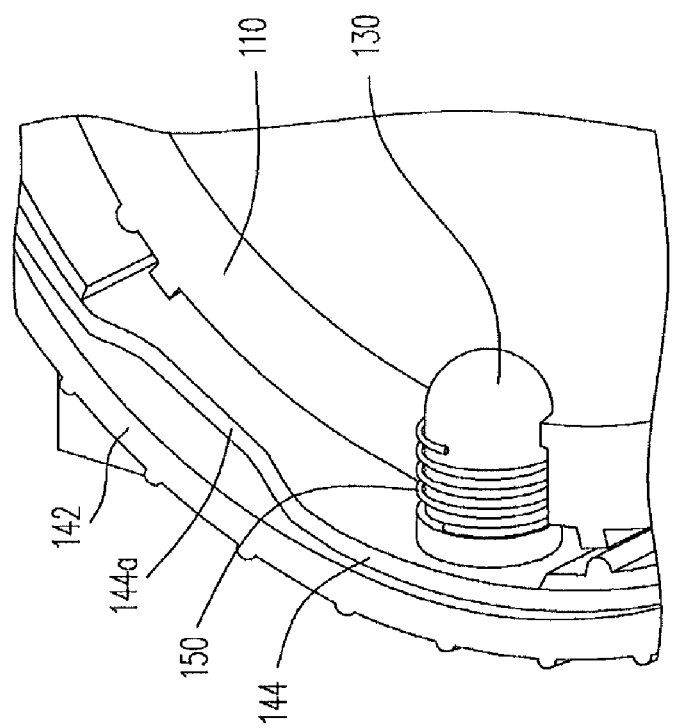

FIG. 6A and FIG. 6B are top views showing parts of the hinge device in FIG. 1 in operation. FIG. 7A and FIG. 7B are three-dimensional diagrams showing parts of the hinge device in FIG. 1 in operation. Please refer to FIG. 6A and FIG. 7A. The user can rotate the spherical joint 120 to the specific position relative to the bearing seat 110, such that the positioning pins 130 correspond to the positioning holes 122. At that moment, since the protrusions 144a of the retaining ring 140 are not rotated to correspond to the positioning pins 130, the positioning pins 130 are not wholly pushed into the corresponding positioning holes 122. That is, the positioning pins 130 and the spherical joint 120 just have slight structural interference. The spherical joint 120 can still be rotated relative to the bearing seat 110, and when rotating the spherical joint 120, the user can feel whether the positioning pins 130 correspond to the positioning holes 122 via the slight structural interference thus to achieve a preliminary positioning function.

Please refer to FIG. 6B and FIG. 7B. After the positioning pins 130 correspond to the positioning holes 122 (as shown in FIG. 6A and FIG. 7A), the retaining ring 140 can be rotated to allow the protrusions 144a to be rotated to correspond to the positioning pins 130, such that the positioning pins 130 are pushed into the positioning holes 122 via the protrusions 144a. At that moment, the spherical joint 120 and the bearing seat 110 are fixed at the relative angle via the structural interference between the positioning pins 130 and the spherical joint 120.

Please refer to FIG. 6A and FIG. 6B. The hinge device 100 further includes a plurality of elastic elements 150. Each of the elastic elements 150 may be a spring and is disposed between the positioning pins 130 and the bearing seat 110. In the embodiment, each of the springs is sleeved on the respective positioning pin 130. When the protrusions 144a correspond to the positioning pins 130 and push the positioning pins 130 into the positioning holes 122, the elastic elements 150 are pressed. When the protrusions 144a leave the position corresponding to the positioning pins 130, the positioning pins 130 can leave the positioning holes 122 via elastic force of the elastic elements 150.

Figure 8A:
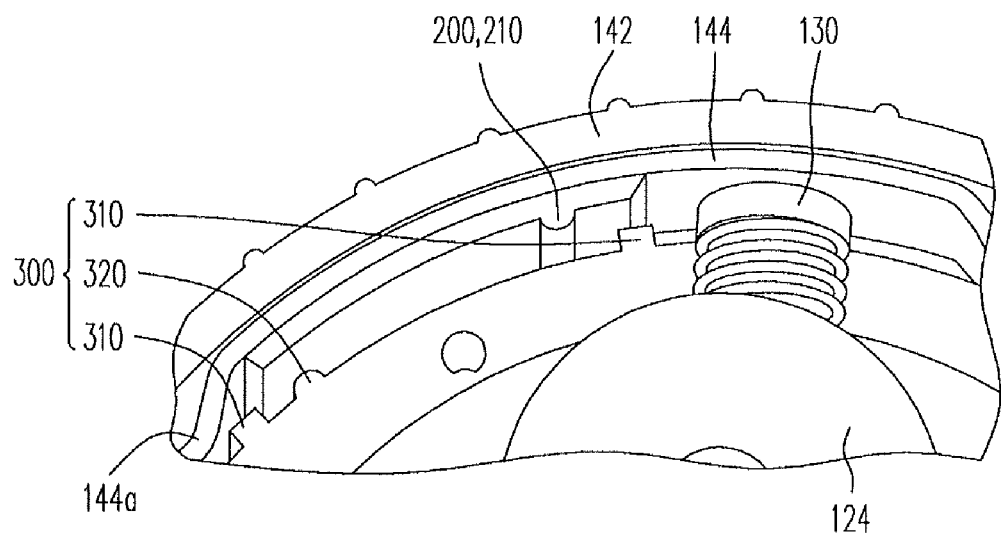
FIG. 8A and FIG. 8B are three-dimensional diagrams showing parts of the hinge device in FIG. 1 in operation.
Figure 8B:
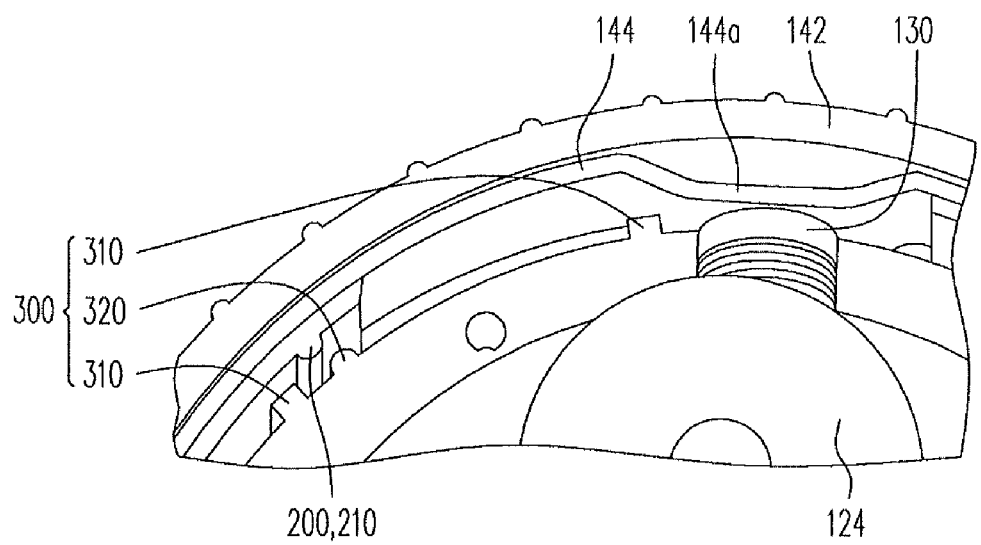

FIG. 8A and FIG. 8B are three-dimensional diagrams showing parts of the hinge device in FIG. 1 in operation. Please refer to FIG. 6A, FIG. 6B, FIG. 8A, and FIG. 8B. In the embodiment, the retaining ring 140 and the bearing seat 110 have at least one first positioning structure 200 and at least one second positioning structure 300 corresponding to each other, respectively. After the retaining ring 140 is rotated the specific angle relative to the bearing seat 110, the first positioning structure 200 and the second positioning structure 300 are engaged with each other (as shown in FIG. 6B and FIG. 8B). There may be a plurality of positioning structures. In the embodiment, the numbers of the first positioning structure 200 and the second positioning structure 300 are four, respectively.

In detail, the first positioning structure 200 includes a first protruding rib 210. The second positioning structure 300 includes two blocking portions 310 and a second protruding rib 320. The first protruding rib 210 is disposed to move between the two blocking portions 310. The second protruding rib 320 is adjacent to one of the blocking portions 310. Therefore, after the retaining ring 140 is rotated the specific angle relative to the bearing seat 110 to allow the positioning pins 130 to be fastened in the corresponding positioning holes 122 (as shown in FIG. 6B and FIG. 8B), the first protruding rib 210 is engaged between the second protruding rib 320 and the adjacent blocking portion 310 thereof, such that the protrusions 144a can be firmly fixed to correspond to the positioning pins 130. In an embodiment which is not shown, the first positioning structure 200 and the second positioning structure 300 may also be disposed at the bearing seat 110 and the retaining ring 140, respectively, and they may have the same positioning function as mentioned above.

Please refer to FIG. 1 and FIG. 2. In the embodiment, the hinge device 100 further includes a fixed bracket 160. The fixed bracket 160 is connected with the bearing seat 110, and the spherical joint 120 is adapted to be connected with an object 400. The object 400 may be a personal digital assistant (PDA), a tablet PC, a digital camera, a global positioning system (GPS), or other electronic devices. In addition, in an embodiment which is not shown, the fixed bracket 160 may further be connected with the spherical joint 120, and the bearing seat 110 may be connected with the object 400.

Please refer to FIG. 2 and FIG. 5. In the embodiment, the spherical joint 120 has a connecting portion 124. The hole 116a exposes the portion of the spherical joint 120, and the connecting portion 124 extends from the portion of the spherical joint 120 exposed from the hole 116a to be connected with the object 400.

Figure 9:
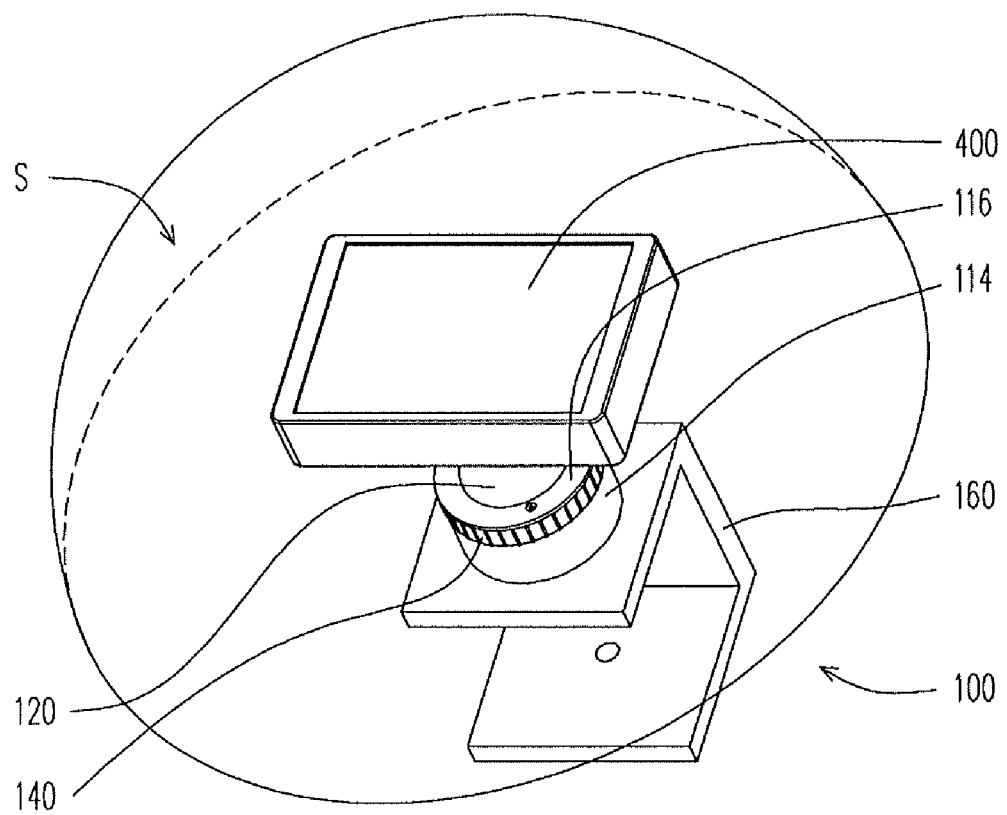
FIG. 9 is a schematic diagram showing a rotatable range of the hinge device in FIG. 1.

FIG. 9 is a schematic diagram showing a rotatable range of the hinge device in FIG. 1. Please refer to FIG. 9. Via the disposition mode of the hinge device 100, the rotatable range of the object 400 relative to the hinge device 100 can cover a spherical surface S. When the user is to adjust the angle of the object 400, the user only needs to rotate the retaining ring 140 to release the spherical joint 120 and the bearing seat 110 which are relatively fixed. After the user rotates the object 400 to a suitable angle, he or she can rotate the retaining ring 140 again to fix the spherical joint 120 and the bearing seat 110 at the relative angle.

To sum up, the hinge device in the invention has a wide rotatable range via the rotation of the spherical joint relative to the bearing seat, and the positioning pins can be pushed into the positioning holes of the spherical joint via the rotation of the retaining ring thus to achieve a positioning function. Therefore, users can conveniently operate the hinge device. In addition, the first protruding rib of the retaining ring can be engaged between the second protruding rib and the blocking portion of the bearing seat, such that the protrusions of the retaining ring can be fixed to correspond to the positioning pins thus to allow the object and the hinge device to be capable of being firmly fixed at a specific relative angle.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A hinge device comprising:
   a bearing seat having a containing recess;
   a spherical joint rotatably disposed in the containing recess, the surface of the spherical joint having a plurality of positioning holes;
   a plurality of positioning pins disposed at the bearing seat, the positioning pins capable of sliding toward or away from the spherical joint and correspond to parts of the positioning holes respectively when the spherical joint rotates to a specific position relative to the bearing seat; and
   a retaining ring disposed at an opening of the containing recess of the bearing seat and surrounding the positioning pins, the retaining ring being against the positioning pins to allow the positioning pins to slide toward the spherical joint thus to be fastened in the corresponding positioning holes when the spherical joint rotates to the specific position relative to the bearing seat.

2. The hinge device according to claim 1, wherein the bearing seat comprises:
   a cup-shaped body providing the containing recess, the cup-shaped body having a plurality of notches at the periphery of the opening of the containing recess for containing the positioning pins, to allow portions of the positioning pins to protrude from an inner wall of the containing recess; and
   a cover disposed at the opening of the containing recess to retain the spherical joint in the containing recess, a hole disposed at the center of the cover for exposing a portion of the spherical joint.

3. The hinge device according to claim 1, further comprising a plurality of elastic elements disposed between the positioning pins and the bearing seat.

4. The hinge device according to claim 3, wherein each of the elastic elements is a spring.

5. The hinge device according to claim 1, wherein the retaining ring has a plurality of protrusions at the inner side, and the retaining ring is against the positioning pins by the protrusions after being rotated a specific angle relative to the bearing seat.

6. The hinge device according to claim 5, wherein the retaining ring comprises:
   an outer ring surrounding the positioning pins; and
   an inner ring disposed between the outer ring and the positioning pins for providing the protrusions.

7. The hinge device according to claim 6, wherein the inner ring is a ring-shaped elastic sheet, and a portion of the ring-shaped elastic sheet is bent inwardly to form the protrusions.

8. The hinge device according to claim 5, wherein the retaining ring and the bearing seat have at least one first positioning structure and at least one second positioning structure corresponding to each other, respectively, and after the retaining ring rotates the specific angle relative to the bearing seat, the first positioning structure and the second positioning structure are engaged with each other.

9. The hinge device according to claim 8, wherein the first positioning structure comprises a first protruding rib, the second positioning structure comprises two blocking portions and a second protruding rib, the first protruding rib is disposed to move between the two blocking portions, the second protruding rib is adjacent to one of the blocking portions, such that after the retaining ring rotates the specific angle relative to the bearing seat, the first protruding rib is engaged between the second protruding rib and the adjacent blocking portion.

10. The hinge device according to claim 1, further comprising a fixed bracket connected with the bearing seat or the spherical joint.

* * * * *